US008914890B2

(12) United States Patent
Pistoia et al.

(10) Patent No.: US 8,914,890 B2
(45) Date of Patent: *Dec. 16, 2014

(54) DETERMINING THE VULNERABILITY OF COMPUTER SOFTWARE APPLICATIONS TO PRIVILEGE-ESCALATION ATTACKS

(75) Inventors: Marco Pistoia, Amawalk, NY (US); Ori Segal, Tel Aviv (IL); Omer Tripp, Har-Adar (IL)

(73) Assignee: International Business Machines Corporation, Armonk, NY (US)

( * ) Notice: Subject to any disclaimer, the term of this patent is extended or adjusted under 35 U.S.C. 154(b) by 273 days.

This patent is subject to a terminal disclaimer.

(21) Appl. No.: 13/018,342

(22) Filed: Jan. 31, 2011

(65) Prior Publication Data

US 2012/0198557 A1 Aug. 2, 2012

(51) Int. Cl.
*G06F 11/00* (2006.01)
*H04L 29/06* (2006.01)
*G06F 21/57* (2013.01)
*G06F 21/56* (2013.01)

(52) U.S. Cl.
CPC .......... *G06F 21/563* (2013.01); *H04L 63/1433* (2013.01); *G06F 21/577* (2013.01)
USPC ............... 726/25; 726/26; 713/187; 713/188; 713/189

(58) Field of Classification Search
CPC ....... G06F 21/577; G06F 21/56; G06F 21/53; G06F 21/55; G06F 21/6218; G06F 12/14; G06F 12/1491; G06F 21/563; H04L 63/1416; H04L 63/1433; G06Q 10/0635
See application file for complete search history.

(56) References Cited

U.S. PATENT DOCUMENTS

| 7,207,065 | B2 | 4/2007 | Chess et al. |
| 7,900,193 | B1 * | 3/2011 | Kolawa et al. ................ 717/126 |
| 8,099,760 | B2 * | 1/2012 | Cohen et al. ...................... 726/2 |
| 2005/0010806 | A1 * | 1/2005 | Berg et al. ..................... 713/200 |
| 2005/0273854 | A1 | 12/2005 | Chess et al. |
| 2005/0273859 | A1 * | 12/2005 | Chess et al. ..................... 726/25 |
| 2007/0074188 | A1 | 3/2007 | Huang et al. |
| 2008/0104665 | A1 * | 5/2008 | Naldurg et al. ................... 726/2 |
| 2009/0327943 | A1 | 12/2009 | Medvedev et al. |
| 2010/0083240 | A1 | 4/2010 | Siman |

OTHER PUBLICATIONS

Lin et al., "The Automatic Defense Mechanism for Malicious Injection Attack", IEEE, 2007, pp. 709-714.*
Lin et al., "The Automatic Defence Mechanism for Malicious Injection Attack", Proceedings of the 7th IEEE International Conference on Computer and Information Technology, Oct. 16, 2007, pp. 709-714.

(Continued)

*Primary Examiner* — Shewaye Gelagay
(74) *Attorney, Agent, or Firm* — North Shore Patents, P.C.; Michele Liu Baillie

(57) ABSTRACT

Determining the vulnerability of computer software applications to privilege-escalation attacks, such as where an instruction classifier is configured to be used for identifying a candidate access-restricted area of the instructions of a computer software application, and a static analyzer is configured to statically analyze the candidate access-restricted area to determine if there is a conditional instruction that controls execution flow into the candidate access-restricted area, perform static analysis to determine if the conditional instruction is dependent on a data source within the computer software application, and designate the candidate access-restricted area as vulnerable to privilege-escalation attacks absent either of the conditional instruction and the date source.

18 Claims, 4 Drawing Sheets

(56) References Cited

OTHER PUBLICATIONS

SPI Labs, "Hybrid Analysis—An Approach to Testing Web Application Security", 2006, pp. 1-19.

OW ASP Top 10 (2010 release candidate 1)—Document Transcript. URL: http://www.slideshare.net/jeremiahgrossman/owasp-top-10-2010-release-candidate-1.

"Testing for Privilege escalation (OW ASP-AZ-003)"; URL: http://www.owasp.org/index.php/ Testing_for_Privilege_escalation_%28OW ASP-AZ-003%29; Feb. 6, 2009; all pages.

Walter Chang et al., "Efficient and Extensible Security Enforcement Using Dynamic Data Flow Analysis", Conference on Computer and Communications Security, Proceedings of the 15th ACM conference on Computer and Communications Security; Alexandria, Virginia; Oct. 27-31, 2008; pp. 39-50.

"OTA 2010 Excellence Award for Secunia PSI in Desktop Security"; URL: htpp://secunia.com/advisories/37517/; Dec. 3, 2009; all pages.

"Rational AppScan Standard Edition"; URL: http://www-01.ibm.com/software/awdtools/appscan/standard/; Nov. 21, 2010; all pages.

\* cited by examiner

```
if (request.getRequestURL().toString().endsWith("removeUser")){
    if (request.getParameter("user").equals("admin") &&
            request.getParameter("password").equals("AdminPass")) {
        String firstname = request.getParameter("firstname");
        String lastname = request.getParameter("lastname");
        String username = request.getParameter("username");
        if (username == null || username.trim().length() == 0)
            message = "An error has occurred. Please try again later.";
        }
        if (message == null){
            String error = DBUtil.deleteUser(username, firstname, lastname);
            if (error != null) message = error;
        }
    }
}
```

Fig. 3

DETERMINING THE VULNERABILITY OF COMPUTER SOFTWARE APPLICATIONS TO PRIVILEGE-ESCALATION ATTACKS

FIELD OF THE INVENTION

The invention relates to computer software security and analysis in general.

BACKGROUND OF THE INVENTION

A privilege escalation (PE) attack refers to a type of computer-based attack in which an attacker attempts to exploit inadequate or nonexistent controls to gain access to resources of a computer software application that are intended for access only by valid users having privileged rights, or that are intended for access by valid users having even non-privileged rights but that are meant to be off-limits to the attacker. It would be advantageous to check computer software applications during their development to determine whether they are vulnerable to PE attacks.

SUMMARY OF THE INVENTION

In one aspect of the present invention, a method is provided for determining the vulnerability of computer software applications to privilege-escalation attacks, the method including: identifying a candidate access-restricted area of instructions of a computer software application; statically analyzing the candidate access-restricted area to determine if there is a conditional instruction that controls execution flow into the candidate access-restricted area; performing static analysis to determine if the conditional instruction is dependent on a data source within the computer software application; and designating the candidate access-restricted area as vulnerable to privilege-escalation attacks absent either the conditional instruction or the date source. A system and computer program product embodying the invention are also provided.

BRIEF DESCRIPTION OF THE SEVERAL VIEWS OF THE DRAWINGS

The present invention will be understood and appreciated more fully from the following detailed description taken in conjunction with the appended drawings in which:

FIG. 3 is an example of computer software application instructions in accordance with an embodiment of the present invention.

DETAILED DESCRIPTION

Figure 1:
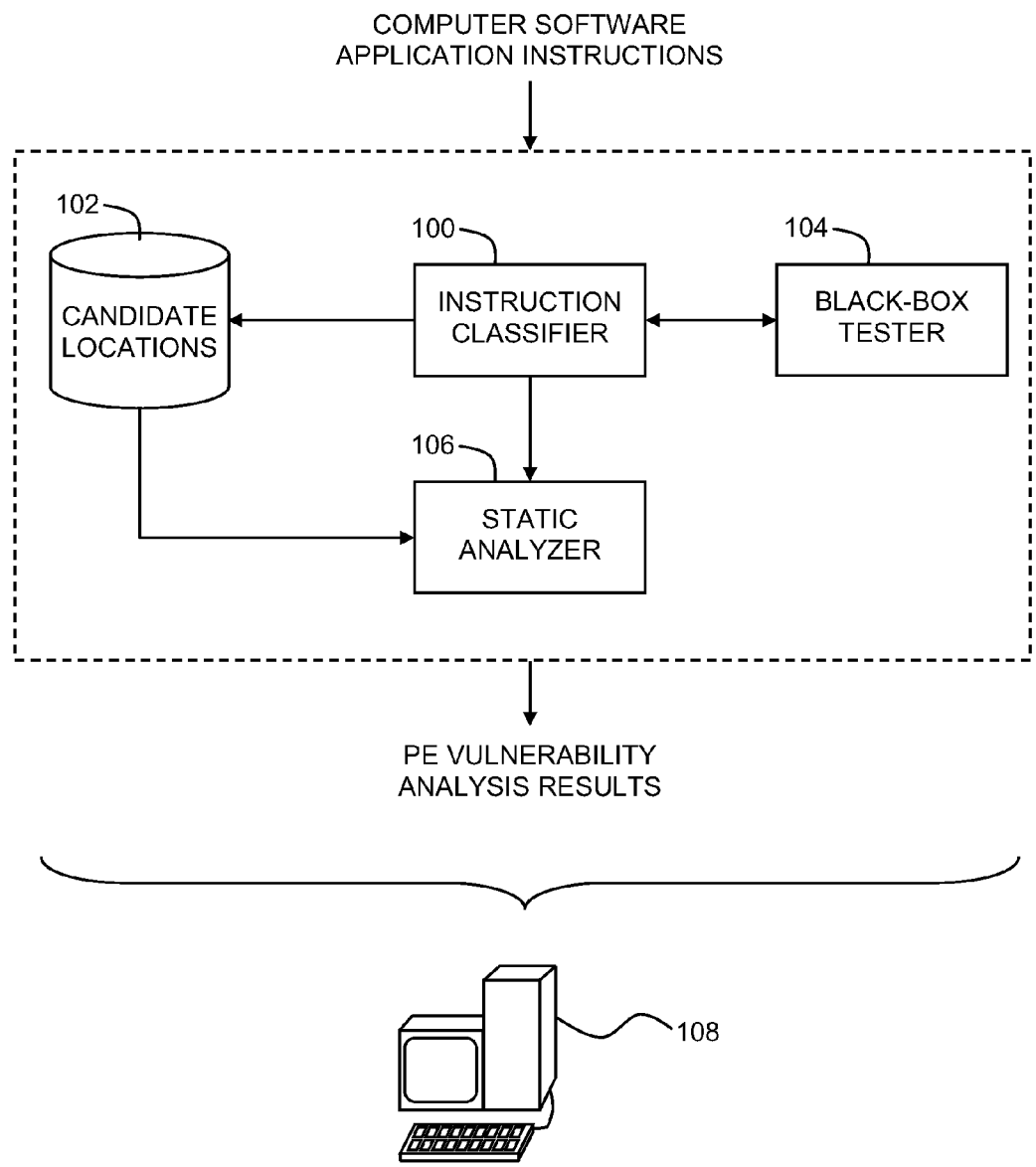
FIG. 1 is a conceptual illustration of a system for determining the vulnerability of computer software applications to privilege-escalation attacks in accordance with an embodiment of the present invention.

The present invention is now described within the context of one or more embodiments, although the description is intended to be illustrative of the present invention as a whole, and is not to be construed as limiting the present invention to the embodiments shown. It is appreciated that various modifications may occur to those skilled in the art that, while not specifically shown herein, are nevertheless within the true spirit and scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1 which is a conceptual illustration of a system for determining the vulnerability of computer software applications to privilege-escalation attacks in accordance with an embodiment of the present invention. In the system of FIG. 1, an instruction classifier 100 is configured to be used for identifying candidate access-restricted areas of the instructions of a computer software application in accordance with predefined criteria for identifying instructions as access-restricted instructions. Such criteria may, for example, include instructions that govern access to the file system or to databases. This may be done manually in accordance with conventional techniques, such as where the user manually scans the source code of the computer software application to identify access-restricted instructions, and enters the location of the identified candidates into instruction classifier 100 via a data entry interface, whereupon instruction classifier 100 preferably stores the candidate locations in a data store of candidate locations 102.

Additionally or alternatively, instruction classifier 100 is configured to control a black-box tester 104 to perform differential black-box testing of the computer software application to identify candidate access-restricted areas of the application using black-box testing software, such as AppScan SE™, commercially-available from International Business Machines Corporation™, Armonk, N.Y. In this approach, black-box tester 104 simulates interactions with the application as a user who is authorized to access restricted areas of the application, such as when a user is logged in to the application as "Administrator". Black-box tester 104 also simulates interactions with the application as a user who is not authorized to access restricted areas of the application, such as when a user is logged in to the application as a regular user. The results of both black-box tests are then compared by instruction classifier 100 to identify those data entry interfaces that were exposed to the authorized user but that were not exposed to the regular user. Using conventional techniques, instruction classifier 100 correlates the identified data entry interfaces with the application source code or byte code instructions underlying the identified data entry interfaces, whereupon such correlated instructions are designated by instruction classifier 100 as candidate access-restricted areas which are preferably stored in candidate locations 102.

Additionally or alternatively, instruction classifier 100 is configured to identify candidate access-restricted areas of the computer software application by statically analyzing the application instructions in accordance with conventional techniques using a predefined specification of security-sensitive operations and/or domain-specific knowledge relating to such operations. For example, a list may be predefined of application programming interfaces (APIs) in the programming language in which the application is written, where the APIs are known to govern access to the file system, databases, and other sensitive areas, on the assumption that only users who have been specifically authorized to access those parts of the application that use these APIs will be able to do so. Areas of the application that access these APIs are designated by instruction classifier 100 as candidate access-restricted areas which are preferably stored in candidate locations 102.

A static analyzer 106 is configured to statically analyze a candidate access-restricted area to determine if there is a conditional instruction that controls whether or not execution flows into the candidate access-restricted area. If no such conditional instruction is found, static analyzer 106 preferably designates the candidate access-restricted area as PE vulnerable on the assumption that access cannot be restricted without conditional authentication. If such a conditional instruction is found, static analyzer 106 preferably performs static analysis to determine if the conditional instruction is dependent on a data source within the application, where a data source is defined as a statement that introduces user input into the application, such as a "getParameter" call of a Java™ servlet. If the conditional instruction is not dependent on a data source, static analyzer 106 preferably designates the candidate access-restricted area as PE vulnerable on the assumption that, lacking access to user input, no authentication of the user could have been performed.

Where a candidate access-restricted area is identified for which there is a conditional instruction that a) controls whether or not execution flows into the candidate access-restricted area and b) is dependent on a data source, the test performed by the conditional instruction may be analyzed to determine whether the test is actually a valid authentication test. For example, static analyzer 106 may perform static analysis to establish which data entry interfaces exposed by the computer software application lead to the test. Then, for each of these data entry interfaces, instruction classifier 100 may control black-box tester 104 to issue two requests targeting the data entry interface, once in the form of a simulated interaction by a user who is authorized to access restricted areas of the application, such as when a user is logged in to the application as "Administrator", and once in the form of a simulated interaction by a user who is not authorized to access restricted areas of the application, such as when a user is logged in to the application as a regular user. If only the former test succeeds, then instruction classifier 100 preferably determines the test to be a valid authentication test. Additionally or alternatively, a description of the test, and/or the candidate access-restricted area, and/or the data source may be presented by instruction classifier 100 to a user who may manually decide whether the test is actually a valid authentication test.

If multiple conditional instructions are found representing multiple execution flow paths into a candidate access-restricted area, and particularly if not all of the conditional instructions perform the same test on the same source data, this finding may be noted by instruction classifier 100 for later reporting as representing poor programming practice.

Any of the elements shown in FIG. 1 are preferably executed by or otherwise made accessible to a computer 108 such as by implementing any of the elements in computer hardware and/or in computer software embodied in a physically-tangible, non-transitory, computer-readable medium in accordance with conventional techniques. Data gathered or produced by any element of the system of FIG. 1 may be presented to a user in accordance with conventional techniques via a computer-controlled output device, such as a printer or computer monitor controlled by computer 108.

Figure 2:
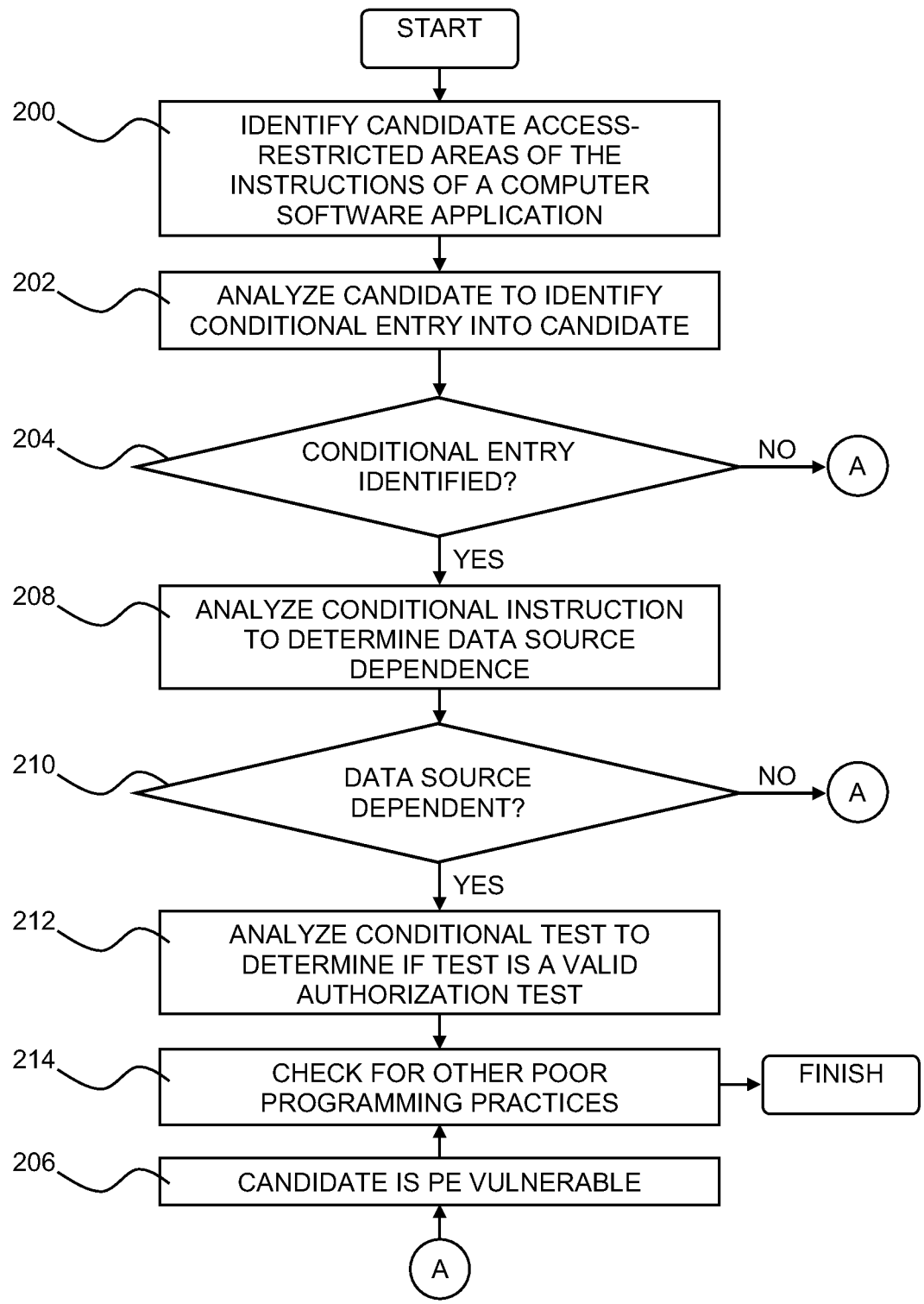
FIG. 2 is a flowchart illustration of an exemplary method of operation of the system of FIG. 1 in accordance with an embodiment of the present invention.

Reference is now made to FIG. 2 which is a flowchart illustration of an exemplary method of operation of the system of FIG. 1 in accordance with an embodiment of the present invention. In the method of FIG. 2, candidate access-restricted areas of the instructions of a computer software application are identified in accordance with predefined criteria for identifying instructions as access-restricted instructions (200). As is described hereinabove with reference to FIG. 1, this may be done manually, by performing differential black-box testing of the application, and/or by statically analyzing the application instructions. For each identified candidate access-restricted area, static analysis is performed to determine if there is a conditional instruction that controls whether or not execution flows into the candidate access-restricted area (202). If no such conditional instruction is found (204), the candidate access-restricted area is preferably designated PE vulnerable (206) on the assumption that access cannot be restricted without conditional authentication. If such a conditional instruction is found, static analysis is performed to determine if the conditional instruction is dependent on a data source (208). If the conditional instruction is not dependent on a data source (210), then the candidate access-restricted area is preferably designated PE vulnerable (206) on the assumption that, lacking access to user input, no authentication of the user could have been performed. Where a candidate access-restricted area is identified for which there is a conditional instruction that a) controls whether or not execution flows into the candidate access-restricted area and b) is dependent on a data source, the test performed by the conditional instruction may be analyzed to determine whether the test is actually a valid authentication test (212). If multiple conditional instructions are found representing multiple execution flow paths into a candidate access-restricted area, and particularly if not all of the conditional instructions perform the same test on the same source data, this finding may be noted for later reporting as representing poor programming practice (214). Data gathered or produced as described above with reference to the method of FIG. 2 may be presented to a user in accordance with conventional techniques via a computer-controlled output device, such as a printer or computer monitor.

The system of FIG. 1 and method of FIG. 2 may be illustrated in the context of FIG. 3, which shows exemplary instructions of a computer software application for deleting a user record from a database in accordance with an embodiment of the present invention. The instructions shown in FIG. 3 are configured to protect against PE attacks by incorporating tests that check whether the user initiating the operation is identified as "admin" and whether the supplied password is correct. If the same instructions lack these tests, the user-removal operation is still "protected" by a test that checks that the URL that triggered the user-removal operation ends with "removeUser". However, this test is inadequate for determining whether or not the current user is identified as "admin", and thus the instructions are vulnerable to PE attacks. Black-box testing as described hereinabove would be able to distinguish between the two cases in the preceding example. Where the "admin" and password tests are present, the instructions for removing the user record will only be invoked during black-box testing when the simulated user is logged in as "admin". Where the "admin" and password tests are absent, the user record will be removed during black-box testing whether or not the simulated user is logged in as "admin", which would indicate that the application is vulnerable to PE attacks.

Figure 4:
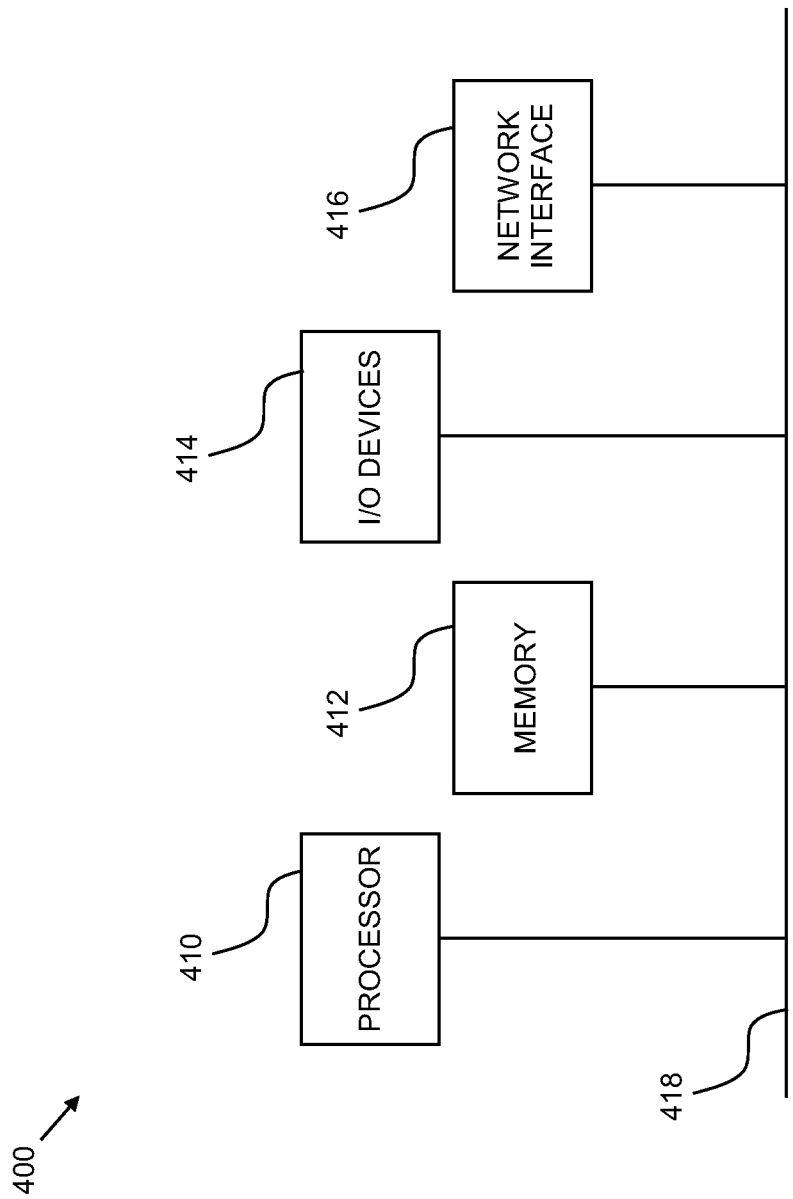
FIG. 4 is a block diagram illustration of an exemplary hardware implementation of a computing system in accordance with an embodiment of the present invention.

Referring now to FIG. 4, block diagram 400 illustrates an exemplary hardware implementation of a computing system in accordance with which one or more components/methodologies of the present invention (e.g., components/methodologies described in the context of FIGS. 1-3) may be implemented, according to an embodiment of the present invention.

As shown, the techniques for controlling access to at least one resource may be implemented in accordance with a processor 410, a memory 412, I/O devices 414, and a network interface 416, coupled via a computer bus 418 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer (not shown).

While the methods and apparatus herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the present invention as a whole and is not to be construed as limiting the present invention to the embodiments shown. It is appreciated that various modifications may occur to those skilled in the art that, while not specifically shown herein, are nevertheless within the true spirit and scope of the present invention.

What is claimed is:

1. A computer program product for determining vulnerability of computer software applications to privilege-escalation attacks, the computer program product comprising:
   a non-transitory computer-readable storage medium; and
   computer-readable program code embodied in said computer-readable storage device, wherein said computer-readable program code is configured to:
   identify a candidate access-restricted area of instructions of a computer software application;
   statically analyze the candidate access-restricted area to determine if there is a conditional instruction that controls execution flow into the candidate access-restricted area;
   in response to determining that the conditional instruction exists, perform static analysis to determine if the conditional instruction is dependent on a user input; and
   in response to determining that the conditional instruction is not dependent on the user input, designate the candidate access-restricted area as vulnerable to privilege-escalation attacks.

2. The computer program product according to claim 1, wherein the computer-readable program code configured to identify the candidate access-restricted area of the instructions of the computer software application is further configured to:
   identify the candidate access-restricted area in accordance with predefined criteria for identifying any of the instructions as access-restricted instructions.

3. The computer program product according to claim 1, wherein the computer-readable program code configured to identify the candidate access-restricted area of the instructions of the computer software application is further configured to:
   receive a manually-entered location of the candidate access-restricted area within the computer software application.

4. The computer program product according to claim 1, wherein the computer-readable program code configured to identify the candidate access-restricted area of the instructions of the computer software application is further configured to:
   perform differential black-box testing of the computer software application to identify the candidate access-restricted area.

5. A computer program product for determining vulnerability of computer software applications to privilege-escalation attacks, the computer program product comprising:
   a non-transitory computer-readable storage medium; and
   computer-readable program code embodied in said computer-readable storage device, wherein said computer-readable program code is configured to:
   perform differential black-box testing of the computer software application to identify a candidate access-restricted area of instructions of a computer software application, comprising:
   control a black-box tester to perform a first test simulating interactions with the computer software application as a user who is authorized to access restricted areas of the computer software application,
   control the black-box tester to perform a second test simulating interactions with the computer software application as a user who is not authorized to the access restricted areas of the computer software application,
   compare the results of both of the tests to identify any data entry interfaces that were exposed to the authorized user but that were not exposed to the unauthorized user,
   correlate the identified data entry interfaces with the computer software application instructions underlying the identified data entry interfaces, and
   designate the correlated instructions as the candidate access-restricted area;
   statically analyze the candidate access-restricted area to determine if there is a conditional instruction that controls execution flow into the candidate access-restricted area;
   in response to determining that the conditional instruction exists, perform static analysis to determine if the conditional instruction is dependent on a user input; and
   in response to determining that the conditional instruction is not dependent on the user input, designate the candidate access-restricted area as vulnerable to privilege-escalation attacks.

6. The computer program product according to claim 1, wherein the computer-readable program code configured to identify the candidate access-restricted area of the instructions of the computer software application is further configured to:
   statically analyze the application instructions using a predefined specification of security-sensitive operations.

7. The computer program product according to claim 1, wherein the computer-readable program code configured to identify the candidate access-restricted area of the instructions of the computer software application comprises:
   statically analyze the application instructions using a predefined specification of domain-specific knowledge relating to security-sensitive operations.

8. The computer program product according to claim 1, wherein the computer-readable program code is further configured to:
   in response to determining that the conditional instruction exists, and to determining that the conditional instruction is dependent on the user input, identify one or more data entry interfaces that is exposed by the computer software application and that leads to an authentication test performed by the conditional instruction; and
   for each identified data entry interface
   perform a first test simulating an interaction with the data entry interface as a user who is authorized to access restricted areas of the computer software application, perform a second test simulating an interaction with the data entry interface as a user who is not authorized to access restricted areas of the computer software application, and if only the first test succeeds, determine the authentication test to be a valid authentication test.

9. The computer program product according to claim 1, wherein the computer-readable program code is further configured to:

present the designation of the candidate access-restricted area as vulnerable to privilege-escalation attacks via a computer-controlled output device.

10. A system for determining the vulnerability of computer software applications to privilege-escalation attacks, the system comprising:

a processor; and a non-transitory computer-readable storage medium comprising computer-readable program code embodied therein, the computer-readable program code configured to:

identify a candidate access-restricted area of instructions of a computer software application;

statically analyze the candidate access-restricted area to determine if there is a conditional instruction that controls execution flow into the candidate access-restricted area;

in response to determining that the conditional instruction exists, perform static analysis to determine if the conditional instruction is dependent on a user input; and in response to determining that the conditional instruction is not dependent on the user input, designate the candidate access-restricted area as vulnerable to privilege-escalation attacks.

11. The system according to claim 10, wherein the computer-readable program code configured to identify the candidate access-restricted area of the instructions of the computer software application is further configured to:

identify the candidate access-restricted area in accordance with predefined criteria for identifying any of the instructions as access-restricted instructions.

12. The system according to claim 10, wherein the computer-readable program code configured to identify the candidate access-restricted area of the instructions of the computer software application is further configured to:

control a black-box tester to perform differential black-box testing of the computer software application to identify the candidate access-restricted area.

13. A system for determining the vulnerability of computer software applications to privilege-escalation attacks, the system comprising:

a processor; and a non-transitory computer-readable storage medium comprising computer-readable program code embodied therein, the computer-readable program code configured to:

control a black-box tester to perform differential black-box testing of a computer software application to identify a candidate access-restricted area, further configured to:

control the black-box tester to perform a first test simulating interactions with the computer software application as a user who is authorized to access restricted areas of the computer software application;

control the black-box tester to perform a second test simulating interactions with the computer software application as a user who is not authorized to the access restricted areas of the computer software application;

compare the results of both of the tests to identify any data entry interfaces that were exposed to the authorized user but that were not exposed to the unauthorized user;

correlate the identified data entry interfaces with the computer software application instructions underlying the identified data entry interfaces; and designate the correlated instructions as the candidate access-restricted areas;

statically analyze the candidate access-restricted area to determine if there is a conditional instruction that controls execution flow into the candidate access-restricted area;

in response to determining that the conditional instruction exists, perform static analysis to determine if the conditional instruction is dependent on a user input; and in response to determining that the conditional instruction is not dependent on the user input, designate the candidate access-restricted area as vulnerable to privilege-escalation attacks.

14. The system according to claim 10, wherein the computer-readable program code configured to identify the candidate access-restricted area of the instructions of the computer software application is further configured to:

identify the candidate access-restricted areas of the computer software application by statically analyzing the application instructions using a predefined specification of security-sensitive operations.

15. The system according to claim 10, wherein the computer-readable program code configured to identity the candidate access-restricted area of the instructions of the computer software application is further configured to:

identify candidate access-restricted areas of the computer software application by statically analyzing the application instructions using a predefined specification of domain-specific knowledge relating to security-sensitive operations.

16. The system according to claim 10, further comprising a black-box tester, wherein the computer-readable program code configured to identity the candidate access-restricted area of the instructions of the computer software application is further configured to:

in response to determining that the conditional instruction exists, and to determining that the conditional instruction is dependent on the user input, identify one or more data entry interfaces that is exposed by the computer software application and that leads to an authentication test performed by the conditional instruction; and for each identified data entry interface, control the black-box tester to perform a first test simulating an interaction with the data entry interface as a user who is authorized to access restricted areas of the computer software application, control the black-box tester to perform a second test simulating an interaction with the data entry interface as a user who is not authorized to access restricted areas of the computer software application, and if only the first test succeeds, determine the authentication test to be a valid authentication test.

17. A computer program product for determining vulnerability of computer software applications to privilege-escalation attacks, the computer program product comprising:

a non-transitory computer-readable storage medium; and computer-readable program code embodied in said computer-readable storage device, wherein said computer-readable program code is configured to:
- identify a candidate access-restricted area of instructions of a computer software application;
- statically analyze the candidate access-restricted area to determine if there is a conditional instruction that controls execution flow into the candidate access-restricted area;
- in response to determining that the conditional instruction exists, perform static analysis to determine if the conditional instruction is dependent on a user input;
- in response to determining that the conditional instruction is not dependent on the user input, designate the candidate access-restricted area as vulnerable to privilege-escalation attacks; and
- in response to determining that the conditional instruction is dependent on the user input:
    - perform a first test simulating interactions with the computer software application as a user who is authorized to access the candidate access-restricted area;
    - perform a second test simulating interactions with the computer software application as a user who is not authorized to access the candidate access-restricted area; and
    - in response to determining a success of the first test only, determine that the conditional instruction is a valid authentication test.

18. A system for determining the vulnerability of computer software applications to privilege-escalation attacks, the system comprising:

a processor; and a non-transitory computer-readable storage medium comprising computer-readable program code embodied therein, the computer-readable program code configured to:
- identify a candidate access-restricted area of instructions of a computer software application;
- statically analyze the candidate access-restricted area to determine if there is a conditional instruction that controls execution flow into the candidate access-restricted area;
- in response to determining that the conditional instruction exists, perform static analysis to determine if the conditional instruction is dependent on a user input;
- in response to determining that the conditional instruction is not dependent on the user input, designate the candidate access-restricted area as vulnerable to privilege-escalation attacks; and
- in response to determining that the conditional instruction is dependent on the user input:
    - perform a first test simulating interactions with the computer software application as a user who is authorized to access the candidate access-restricted area;
    - perform a second test simulating interactions with the computer software application as a user who is not authorized to access the candidate access-restricted area; and
- in response to determining a success of the first test only, determine that the conditional instruction is a valid authentication test.

* * * * *